United States Patent
Kimura et al.

(10) Patent No.: US 7,892,612 B1
(45) Date of Patent: Feb. 22, 2011

(54) INSERT-BONDED CYLINDRICAL ARTICLES, AND A MOLDING METHOD AND A MOLDING APPARATUS THEREFOR TECHNICAL FIELD TO WHICH THE INVENTION PERTAINS

(75) Inventors: Hideyuki Kimura, Tokyo (JP); Tsugio Nomoto, Tokyo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 0 days.

(21) Appl. No.: 09/674,077

(22) PCT Filed: Mar. 1, 1999

(86) PCT No.: PCT/JP99/00986
§ 371 (c)(1), (2), (4) Date: Oct. 26, 2000

(87) PCT Pub. No.: WO00/51802
PCT Pub. Date: Sep. 8, 2000

(30) Foreign Application Priority Data

Aug. 25, 1997 (JP) .................................. 9-243431

(51) Int. Cl.
B32B 1/08 (2006.01)
B29C 45/00 (2006.01)
B32B 29/00 (2006.01)

(52) U.S. Cl. .................... 428/34.1; 428/34.2; 428/35.7; 428/35.9; 428/36.9; 428/36.91; 264/261; 264/267; 425/127; 425/129.1

(58) Field of Classification Search ................ 428/34.1, 428/34.2, 35.7, 35.9, 36.9, 36.91; 264/261, 264/267; 425/127, 129.1
See application file for complete search history.

(56) References Cited

U.S. PATENT DOCUMENTS 4,403,933 A * 9/1983 Davis et al. ............... 425/129.1
4,525,318 A * 6/1985 Reil et al. ............ 264/DIG. 41
4,592,886 A * 6/1986 Mannherz ................... 264/262

(Continued)

FOREIGN PATENT DOCUMENTS

JP 63-242613 10/1988

(Continued)

*Primary Examiner* — Marc A Patterson
(74) *Attorney, Agent, or Firm* — Oliff & Berridge, PLC

(57) ABSTRACT

A molten resin is prevented from entering between a surface of a sheet-shaped insert such as a label including a printed film or the like and a surface of an outer mold unit and the insert is prevented from being downwardly pushed, when a synthetic article in which the insert is bonded to the outer peripheral surface of the thin cylindrical molded body is injection molded by the insertion molding.

The insert such as a label is fitted, closely attached and held along an inner peripheral surface of the outer molding unit in a cavity 7 defined between the outer mold unit 11 and the core 6, a molten resin is injected, through plural injection gate openings 9a provided in the core, toward an inner peripheral surface of the molded body at a position inwardly apart from an end of the insert in an axial direction and corresponding to an inner portion as viewed in width directions from opposite sides of the insert, the cavity is filled with the molten resin while the insert is being pushed to the surface of the outer mold unit with the molten resin, and the molten resin is integrated with the insert, thereby molding the label-attached cylindrical article 10.

19 Claims, 9 Drawing Sheets

U.S. PATENT DOCUMENTS

| | | | |
|---|---|---|---|
| 4,834,638 A | | 5/1989 | Miyahara et al. |
| 5,193,711 A | * | 3/1993 | Hirata et al. ............ 220/62.11 |
| 5,228,186 A | * | 7/1993 | Brettell et al. ................ 29/611 |
| 5,443,767 A | | 8/1995 | Cahill |
| 5,852,896 A | * | 12/1998 | Flasch, Jr. ...................... 47/79 |
| 5,954,223 A | * | 9/1999 | Moore ....................... 220/659 |
| 6,030,573 A | * | 2/2000 | Matsumoto et al. ......... 264/511 |

FOREIGN PATENT DOCUMENTS

| | | | |
|---|---|---|---|
| JP | 03286815 | * | 12/1991 |
| JP | 4-14420 | | 1/1992 |
| JP | 6-246777 | | 9/1994 |
| JP | 06-246777 | * | 9/1994 |
| JP | 6246777 | * | 9/1994 |
| JP | 2579741 | | 6/1998 |
| JP | 11-58445 | | 3/1999 |

* cited by examiner

FIG_1

FIG_2

FIG_4

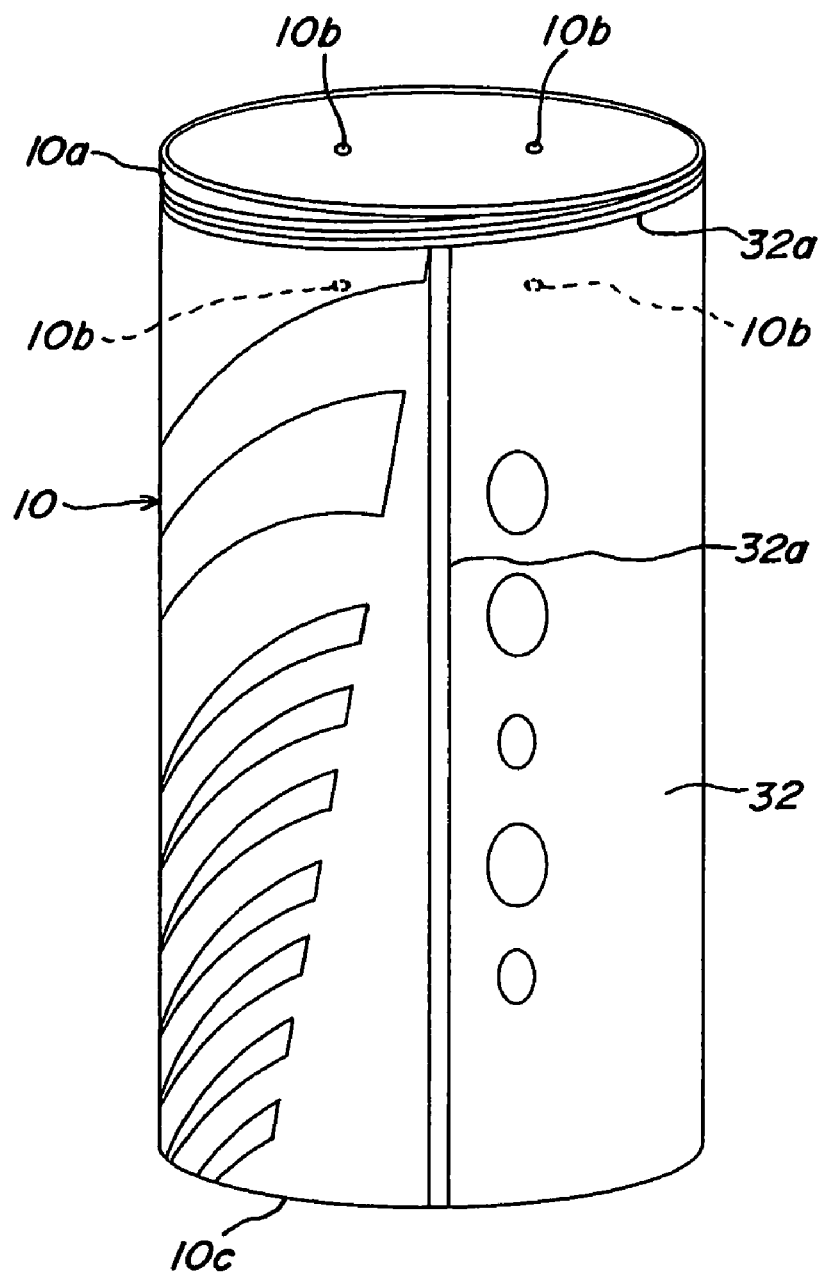

INSERT-BONDED CYLINDRICAL ARTICLES, AND A MOLDING METHOD AND A MOLDING APPARATUS THEREFOR TECHNICAL FIELD TO WHICH THE INVENTION PERTAINS

TECHNICAL FIELD OF THE INVENTION

The present invention relates to insert-bonded cylindrical articles each comprising a cylindrical molded body made from a synthetic resin and a sheet-shaped insert integrally bonded to an outer peripheral surface of the cylindrical molded body, a molding method and a molding apparatus therefor. In particular, the present invention relates to insert-bonded cylindrical articles each obtained by placing an insert such as a label in a molding spade of a molding mold and then injecting a molten resin into the molding space, and also to a molding method and a molding apparatus therefor.

BACKGROUND ART

In order to produce articles in which a sheet-shaped label is bonded to the surface of a molded body made of a synthetic resin, a method has been widely and generally used, which comprises forming molded body by injection molding or blow molding, opening a molding mold to remove the molded body, and manually bonding adhesive-applied labels to outer peripheral surfaces of thus obtained molded bodies one by one or automatically bonding the labels to them by a label-bonding machine.

However, the former manually label-bonding method has the problems in that the manually label-bonding makes the workability worse, and is likely to cause variations in the bonding precision depending upon working persons. As compared with the former manual working, the latter automatically bonding method with the bonding machine has improved workability and the bonding precision can be enhanced by diminishing variations. However, the latter method is disadvantageous from the standpoint of the cost in that the machine is of a large scale, and needs a large machine cost. Further, since the labels are bonded in both of these bonding methods after the synthetic resin-molded bodies are molded, the bonding work itself unfavorably becomes troublesome.

Under these circumstances, JP-A 63-242,613 and JP-A 4-14,420 disclose methods in which label bonding is effected simultaneously with molding the synthetic resin during the molding step, while the troublesome work of forming the above molded body and then bonding label to the surface of the molded body is omitted. According to these publications, a so-called insert molding is effected, which preliminarily placing a label or the like in a molding mold, blow-molding or injection molding a resin and integrating the molded body and the label or the like.

However, although no great problem occurs in the production of the insert molded body by the blow molding as in the former JP-A 63-242,613, close attention is needed when the insert molded body is produced by the injection molding as in the latter JP-A 4-14,420, because the molten resin oozes out to the surface side of the label, and the label is wrinkled.

When an insert molded body is to be produced by injection molding, an insert 50 such as a label or the like is inserted into a predetermined position of an inner surface 51 of an outer mold 51 as shown in FIG. 8(*a*) in the state that a molding mold units 51 and 52 are opened, the label is fixed by suction or the like, and injecting the molten resin into a molding cavity of a mold by an injection molding machine 53 after the molding mold units 51 and 52 are closed as shown in FIG. 8(*b*).

When the molten resin is to be injected into the molding space inside the molding mold, the molten resin is generally injected into the molding cavity through a gate portion 54 provided at an end portion of the molding space. In this case, the molten resin may flow to the surface of the label owing to various factors such as the label 50 being not closely attached the shape of the end portion of the label, the shape of the end portions of the label, the relationship among the flow, the pressure, etc. of the resin.

FIG. 9 is a sectional view of an apparatus for producing a conventional label-bonded cylindrical molded article, which is used for effecting the insert label molding for a cylindrical molded body by injection molding. In the figure, 61 is a molding mold end disc, 62 a mouth portion-molding mold unit for forming a mouth portion of the cylindrical molded body, 63 a barrel portion-molding mold unit, 66 a core, 67 a molding cavity, 67 a mold cavity, 68 a knock-out pin, and 69 an injection nozzle. As shown in FIG. 9, a molten resin is injected through the injection nozzle 69 and an upper end portion of the molding space, it is likely that the molten resin enters between the surface of the label 60 and the barrel portion-molding mold unit 63 and the molten resin pushes down the label 60. Consequently, unacceptable products were often produced.

As countermeasures for removing causes resulting in occurrence of such unacceptable products, the insert is prevented from being deformed or moved by imparting a force resisting the flow of the molten resin through increasing the thickness of the insert such as label or by firmly closely attaching the insert to the inner surface of the molding cavity with the provision of a vacuum sucking means in the molding mold as shown in FIGS. 8(*a*) and 8(*b*).

However, if the insert is made thicker, the cost of the material becomes higher. On the other hand, when the molding mold is provided with the vacuum sucking means to suck the insert 50, 60 such as the label to the inner surface of the molding cavity, the molding apparatus becomes complicated. Therefore, each of these cases results in the increased cost of the products.

In order to simplify the structure of the molding mold to be used for the above insert molding, outer molds of a split mold structure are generally used. However, if molding is effected with such a molding mold, a parting line of the molding mold can not be prevented from being formed at the surface of the molded body.

Problems to be Solved by the Invention

The present invention is to provide an injection molding method and a molding apparatus therefor, which prevent the molten resin from entering between the surface of the sheet-shaped insert such as a label including a printed film or the like and the surface of the outer mold unit and also prevent the insert from being deviated from a predetermined position at the inner surface of the outer mold unit or from being wrinkled by pushing down the insert with the molten resin, when the insert is bonded to the insert-bonded synthetic resin molded body is injection molded by the insert molding. Further, the present invention also relates to the insert-bonded cylindrical article obtained by the above injection molding method.

Countermeasures for Solving the Problems

The insert-bonded cylindrical article according to the present invention is an sheet-shaped insert-bonded cylindrical article molded by insertion molding, comprising a cylindrical molded body, and an insert bonded to an outer peripheral surface of a barrel portion of the cylindrical molded body on molding, wherein a mark of an injection gate opening is positioned at an inner peripheral surface of the cylindrical molded body while being inwardly apart from an upper end of the insert in an axial direction and at a position corresponding to an inner portion of the insert as viewed in width directions from opposite sides of the insert. In the present invention, the "sheet-shaped insert" means a label or the like, and "bonded" means that the insert is integrated to the outer peripheral surface of the barrel portion of the cylindrical molded body through molding.

According to the method for producing the insert-bonded cylindrical article of the present invention comprising a cylindrical molded body and an insert integrally bonded to the outer peripheral surface of a barrel portion of the cylindrical molded body, is a method for insert molding an insert-bonded cylindrical article by insertion molding with use of an insert injection molding mold comprising an outer mold unit having a pull-out mold unit and defining a core-inserting space therein, and a core to be inserted and fitted into the outer molding unit, said method comprising fitting, closely attaching and holding an insert along an inner peripheral surface of the outer molding unit in a molding cavity defined between the outer mold unit and the core inside the injection molding mold, injecting a molten resin, through an injection gate opening provided in the core, toward an inner peripheral surface of the molded body at a position inwardly apart from an upper end of the insert in an axial direction and corresponding to an inner portion as viewed in width directions from opposite sides of the insert, curing and forming the cylindrical molded body while pushing the insert onto the inner peripheral surface of the outer molding unit with the molten resin, and thereby producing the insert-bonded cylindrical article comprising the molded body and the insert integrally bonded to an outer peripheral surface of a barrel portion of the cylindrical molded body. In order to uniformly and rapidly charge the molten resin into the molding cavity, preferably a plurality of the gate openings are radially provided.

The apparatus according to the present invention for molding an insert-bonded cylindrical article comprising a cylindrical molded body and an insert integrally bonded to an outer peripheral surface of a barrel body of the cylindrical molded body, said apparatus comprising an outer mold unit having a pull-out mold unit and defining a core-inserting space, a core to be inserted into the core-inserting space of the outer molding unit from one end thereof and to define a molding cavity between an inner peripheral surface of the core-molding space, and a releasing tool for releasing the shaped insert-bonded cylindrical article from the mold, the outer molding unit comprising a barrel portion-molding mold unit having said core-inserting space and an end portion-molding mold unit to be engaged with the barrel portion-molding mold unit at the other end of the outer mold unit, having a molten resin-injecting opening and being capable of moving outside from an end portion, and the core having a gate hole communicating with the molten resin-injecting opening at one end, having the other end that is at the outer peripheral surface of the core and axially inwardly from the end portions of the insert fitted along the outer peripheral surface of the core-inserting space and at an inner portion of the insert located inwardly from both width sides of the insert.

According to a preferred embodiment of the insert-bonded cylindrical article of the present invention, the insert is bonded to a circumferentially entire outer peripheral surface of the cylindrical molded body, and the mark of the injection gate opening is located in a position avoiding a butted portion of both side portions of the insert.

Following are recited as preferred embodiments of the method for molding the insert-bonded cylindrical article of the present invention. Features of any combination of the following (1) to (3) are considered to be preferred embodiments of the molding method according to the present invention, so long as no contradiction occurs.

(1) The insert is fitted, closely attached and held along a circumferentially entire inner peripheral surface of the cavity of the outer molding unit, and the molten resin is injected toward a position avoiding a butted portion of both side portions of the insert.

(2) A knock-out pin is provided in the core, and the method further comprises upwardly pulling out the pull-out mold unit of the outer mold unit after the insertion molding, cutting connection between the cured resin inside the injection gate opening and the cylindrical molded body by raising the knock-out pin, and removing the cylindrical article from the core by pushing a bottom portion of the cylindrical molded body. More preferably, the connection between the cured resin in the injection gate opening and the cylindrical molded body is cut by raising the knock-out pin, and simultaneously the cylindrical molded body is removed from the core by pushing up the bottom of the cylindrical article.

(3) The insert is fitted, closely attached and held in a cylindrical shape along the inner peripheral surface of the outer mold unit in the molding cavity inside the injection molding mold by partially fitting the insert in a cylindrical shape into the outer mold unit of the mold in a state that the core of the injection molding mold is pulled out from the outer mold unit and the molding cavity is opened, forwardly moving the core into the outer mold unit, and applying a contact frictional force between the core and the insert.

Following are recited as preferred embodiments of the molding apparatus according to the present invention. Features of any combination of the following (1) to (4) are considered to be preferred embodiments of the molding method according to the present invention, so long as no contradiction occurs.

(1) The insert-bonded cylindrical article has a mouth portion, and the end portion-molding mold unit comprises a molding mold end disc, as the pull-out mold unit, having a molten resin-injecting opening, and a mouth portion mold unit to be engaged with the mold end disc and form the mouth portion of the cylindrical article.

(2) Radial molten resin runner grooves are formed at a joint face between one end of the core and the end portion-molding mold unit, and one end opening of the gate hole is to communicate with end portions of the running grooves.

(3) The outer mold comprising a stopper mold movable axially and adapted to form the other end of the cylindrical molded body, and the releasing tool is said stopper mold.

(4) The releasing tool further comprises a knock-out pin provided movably forwardly and rearwardly in a central portion of the core, and connection between the cured resin inside the injecting gate opening and the cylindrical molded body is cut by raising the knock-out pin.

BRIEF DESCRIPTION OF THE DRAWINGS

FIG. 7 is a perspective view of the sheet-shaped insert-bonded article molded according to the present invention.

BEST MODE OF CARRYING OUT THE INVENTION

In the following, best embodiments of the present invention will be explained with reference to the drawings.

Figure 1:
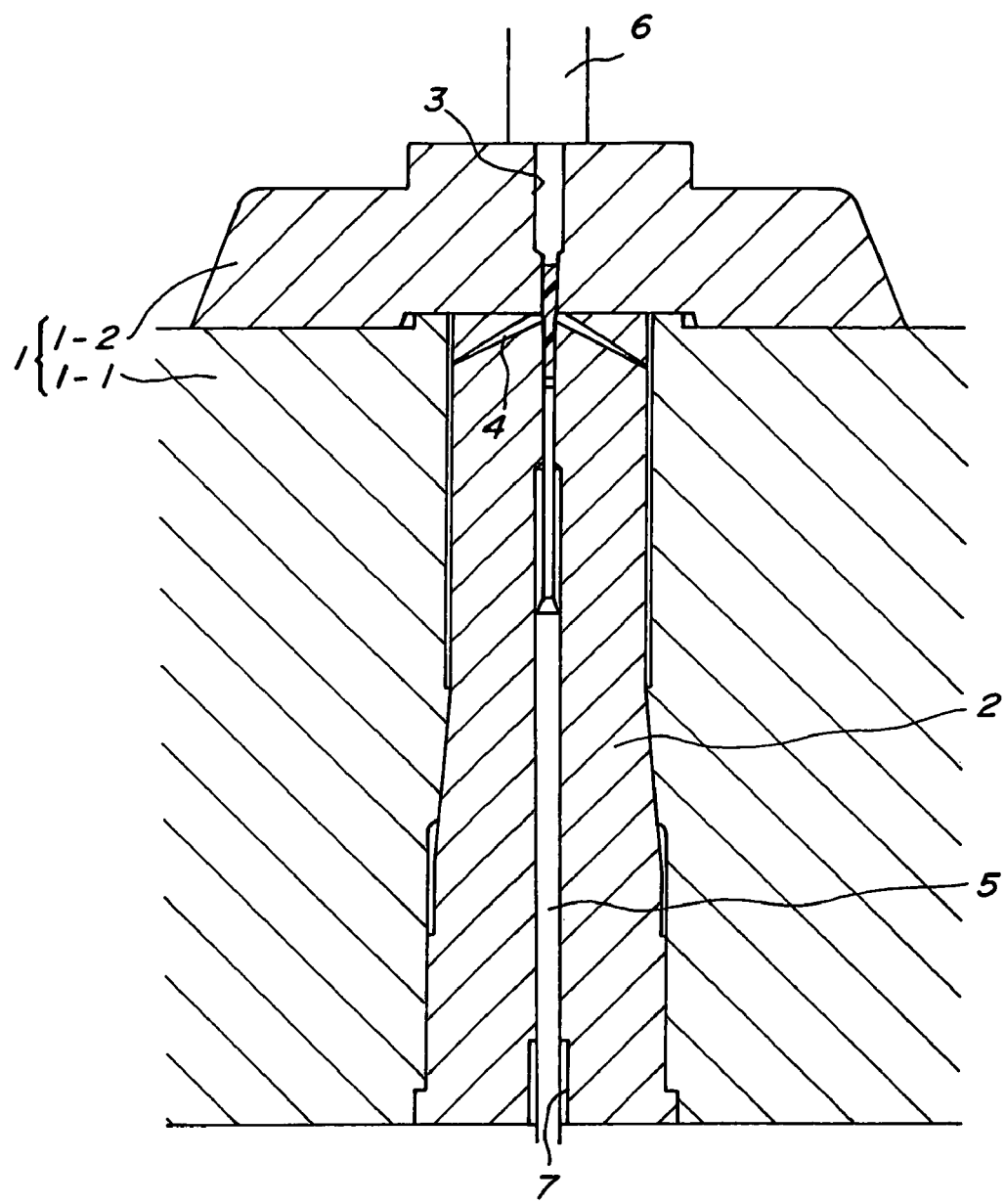
FIG. 1 is a sectional view for schematically illustrating the method and apparatus for molding the sheet-shaped insert-bonded cylindrical article according to the present invention.

First, the molding method and the molding apparatus according to the present invention will be explained with reference to a sectional view of the sheet-shaped insert-bonded cylindrical article-producing apparatus schematically shown in FIG. 1. The sheet-shaped insert-bonded cylindrical article-molding apparatus according to the present invention comprises an outer mold unit 1 having a core-inserting space, a core 2 to be inserted into the core-inserting space of the outer mold unit 1 from one end of the outer mold unit and defining a molding cavity between the inner peripheral surface of the outer mold unit, and a releasing tool for releasing the resulting insert-bonded cylindrical article from the mold.

The outer mold unit 1 comprises a barrel portion-molding mold unit 1-1 having the core-inserting space and an end portion molding mold unit 1-2 to be detachably engaged with the other end of the barrel portion-molding mold unit 1-1, having a molten resin injection opening 3 and being movable outwardly from the end portion. The core 2 has a gate hole 4 that communicates with the molten resin injection opening 3 at one end, and has the other end located at an outer peripheral surface of the core and at a position axially inwardly from an end of the insert fitted along the inner peripheral surface of the core-inserting space. The releasing tool comprises a knock-out pin 5 arranged movably forwardly and rearwardly in a through-hole that is provided in a central portion of the core and communicates with one end of the molten resin injection opening 3. A reference numeral 6 denotes an injection nozzle of an injection device for supplying the molten resin into the molten resin injection opening 3 of the end portion-molding mold unit 1-2. FIG. 1 shows a mold-closed state of the molding apparatus.

First, the core 2, which is an inner mold unit of the injection molding mold for molding the thin cylindrical article, is pulled out from the outer mold unit 1, thereby opening the mold. In this state, an insert is rounded, inserted and fitted along the inner peripheral surface of the outer mold unit 1 of the injection molding mold. When the cylindrically rounded insert is fitted into the molding cavity, the insert is opened radially outwardly and closely fitted and held into the molding cavity. When the cylindrically rounded insert is to be inserted, the insert is inserted in a cylindrical shape up to an appropriate location of the cavity-forming surface of the outer molding unit 1, the core 2 is then advanced into the outer mold unit 1, and the insert is inserted into a predetermined location inside the molding cavity through a contact frictional force between the insert and the core 1. The molding mold apparatus is closed by completely fitting the core into the outer mold unit, so that the molding cavity capable of molding the cylindrical article is defined between the outer mold unit and the core.

After the molding apparatus is closed, the injection nozzle 6 of the injection device is connected to an upper portion of the molten resin injection opening 3 of the end portion-molding mold unit 1-2 of the outer mold unit 1, and then the molten resin is injected toward the inner surface of the insert from the injection nozzle 6 of the injection device through the molten resin injection opening 3 of the end portion-molding unit 1-2 and the injection gate hole 4 provided in the core 2. Thereby, the molten resin is injected into the molding cavity, while pushing the insert to the inner peripheral surface of the outer mold unit. Thereafter, the cylindrical molded body is formed through curing. As a result, the insert-bonded cylindrical article comprising the cylindrical molded body and the insert integrally bonded to the outer peripheral surface of the barrel portion of the cylindrical molded body is molded. In this case, the phrase "the molten resin is injected toward the inner surface of the insert" means that the molten resin is injected to an inner surface position inwardly from ends of the insert through the gate opening provided slightly axially inwardly from a tip end of the core 2 and provided at a position inwardly from both side portions of the insert. By so doing, the molten resin injected is prevented from entering between the inner peripheral surface of the outer mold unit and the insert in the molding cavity.

Further, the molten resin injected can be more assuredly prevented from entering between the inner peripheral surface of the outer mold unit and the insert in the molding cavity by appropriately setting the size and the arranging position of the insert, the position of the injection gate opening, the injection speed and the pressure of the molten resin, etc. When the insert is fitted, closely attached and held along the almost entire inner peripheral surface of the cavity of the outer mold unit and the molten resin is injected to a position that is axially inwardly from an end of the insert and avoids a butted portion of the opposite side portions of the insert, the molten resin injected can be more assuredly prevented from entering between the inner peripheral surface of the outer mold unit and the insert in the molding cavity.

Thereafter, the injection nozzle of the injection device is removed from the molten resin injection opening, and the end portion-molding mold unit 1-2 and the barrel portion-molding apparatus 1-1 are upwardly moved away, thereby opening the molding apparatus. Then, the knock-out pin 17 is pushed upwardly, the cured resin inside the injection gate hole which is attached to the inner surface of the insert-bonded cylindrical article is cut off, and the insert-bonded cylindrical article formed on the outer peripheral surface of the core is removed by an appropriate means not shown.

In the following, one best embodiment of the method and the apparatus for molding the label-attached cylindrical article by injection molding using the injection molding method will be explained with reference to FIGS. 2 to 6.

Figure 2:
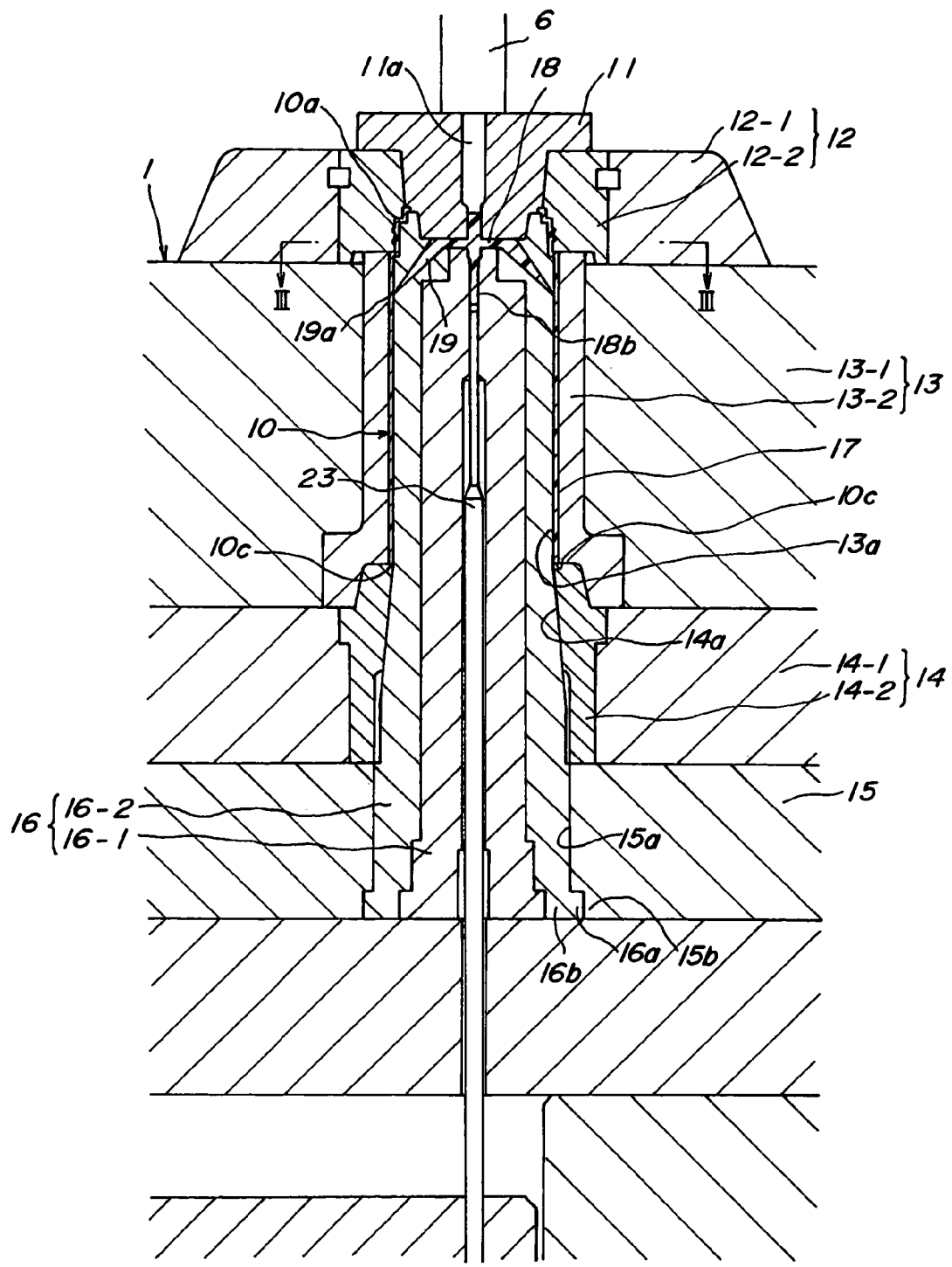
FIG. 2 is a sectional view of showing a preferred embodiment of the apparatus for molding the sheet-shaped insert-bonded cylindrical article according to the present invention.
Figure 3:
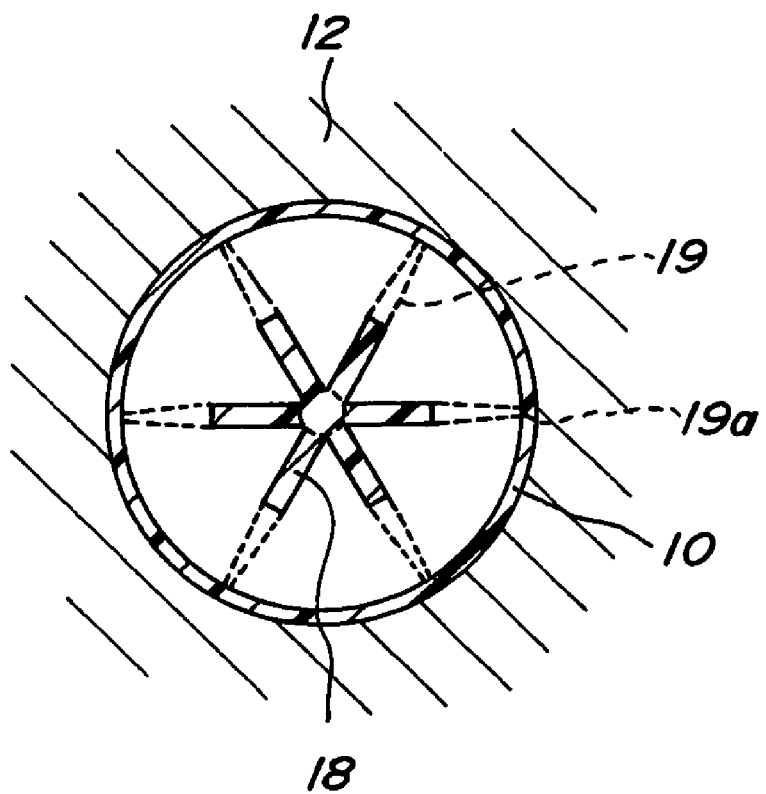
FIG. 3 is a sectional view taken along of the sheet-shaped insert-bonded cylindrical article.

The insert-bonded cylindrical article injection mold according to the present invention is to insert mold a sheet-shaped insert cylindrical article 10 having a mouth portion 10a at one end by injection molding (See FIG. 7). As mentioned above, a molding mold comprises an outer mold, a core and a releasing tool. As shown in FIG. 2, an end portion-molding mold unit 1-2 comprises an end disc 11 as an upper portion-molding mold unit having an injection opening 11a to which the nozzle 6 of the injection molding device is fitted and a mouth-molding mold unit 12 of a laterally split type which surrounds and engages with the end disc and is adapted to mold a mouth portion 10a of the cylindrical article 10.

The outer mold unit further comprises a barrel portion-molding unit 13 to which the mouth-molding mold unit 12 is detachably butted and which is adapted to form a barrel portion of the cylindrical article, and a stopper mold unit 14 which is located under the barrel portion-molding unit 13 and butted to an end of the molding unit 13. The barrel portion-molding unit 13 and the stopper mold unit 14 form the barrel portion and a bottom end face of the cylindrical article, respectively. The barrel portion-molding unit 13 and the stopper mold unit 14 are fixed and supported by a bottom disc 15 of the molding mold. A member immediately under the bottom disc 15 of the molding mold is a stationary plate through which a knock-out pin is passed. The barrel portion-molding mold unit 13, the stopper mold unit 14 and the bottom disc 15 are provided with concentric inner cavities 13a, 14a and 15a, respectively, through which the core 6 is introduced forwardly and rearwardly from the lower side.

The molding inner cavity 14a of the stopper mold unit 14 is designed as a plane tapered in section that is inclined outwardly in a downward direction, and can closely contact a corresponding inclined face of the core 16. The core is provided with a flange 16a at a lower end portion thereof, which engages with a recess 15b of the bottom disc 15 of the molding mold at a lower inner end portion to stop rise of the core 16. When the core 16 is completely inserted into the molding inner cavities 13a, 14a and 15a, the upper end of the core closely contacts the end disc 11 and the mouth portion-molding mold unit 12 of the upper mold unit, so that a molding cavity is defined between the core 16 and the mouth portion-molding mold unit 12 for molding the mouth portion 10a of the cylindrical article and that a molding cavity is formed between the core 16 and the molding inner cavity 13a of the barrel portion molding mold unit 13 for molding the barrel portion of the cylindrical article. Considering heat resistance, wear resistance, etc. in molding the molten resin, each of the mouth portion-molding mold unit 12, the barrel portion-molding mold unit 13, the stopper mold unit 14 and the core 16 comprises a surface portion (12-1, 13-1, 14-1, 16-1) made of a heat-resistance and wear-resistant alloy and a main body (12-2, 13-2, 14-2, 16-2).

At an interface at which the upper end face of the core 16 contacts the lower face of the end disc 11 of the upper mold unit are radially formed runner grooves 18 into which the molten resin injected through the nozzle 6 of the injection molding device is distributed. Taper-like thinned gate holes 19 are provided in a tip end portion of the core such that the gate holes extend from the runner grooves 18 and communicate with the molding cavity 17 (See FIG. 3 as a sectional view of FIG. 2 along III-III). The gate hole 19 is inclined to reach a gate opening 19a which is opened at a position that is under a portion of the molding cavity for the mouth portion 10a of the cylindrical article and axially inwardly separated from the upper end of the insert 32 arranged at the inner peripheral surface of the molding cavity.

A pin hole is provided axially in a central portion of the core 16 from an upper end to a lower end thereof, and communicates with the injection opening 11a of the end disc 11. The pin hole comprises a small-diameter hole portion, an intermediate-diameter hole portion and a large-diameter hole portion from upper to lower sides in this order. A knock-out pin 23, which comprises a small-diameter portion 23a and a large-diameter portion 23b, is closely and slidably fitted into the pin hole such that the small-diameter portion 23a and the large-diameter portion 23b are located in the small-diameter hole portion and the large-diameter hole portion, respectively.

An article in which the insert 32 is insertion-molded at a surface of a thin cylindrical molded body 10 is obtained with use of the above-constructed molding mold by injection molding as follows.

First, the mouth portion-molding unit 12, which is a split mold unit for molding the mouth portion 10a of the cylindrical article 10 is closed from right and left sides and connected with respect to the upper end face of the barrel portion-molding mold unit 13, which is the pull-out mold unit having a cylindrical inner face. Then, the end disc 11 of the upper molding mold unit which engages with the nozzle of the injection molding device is fitted to the mouth portion-molding mold unit, and the cylindrical stopper mold unit 14 is fitted to the lower end portion of the barrel portion-molding unit 13. Thereby, the outer mold unit 1 of the molding mold is formed.

Figure 4:
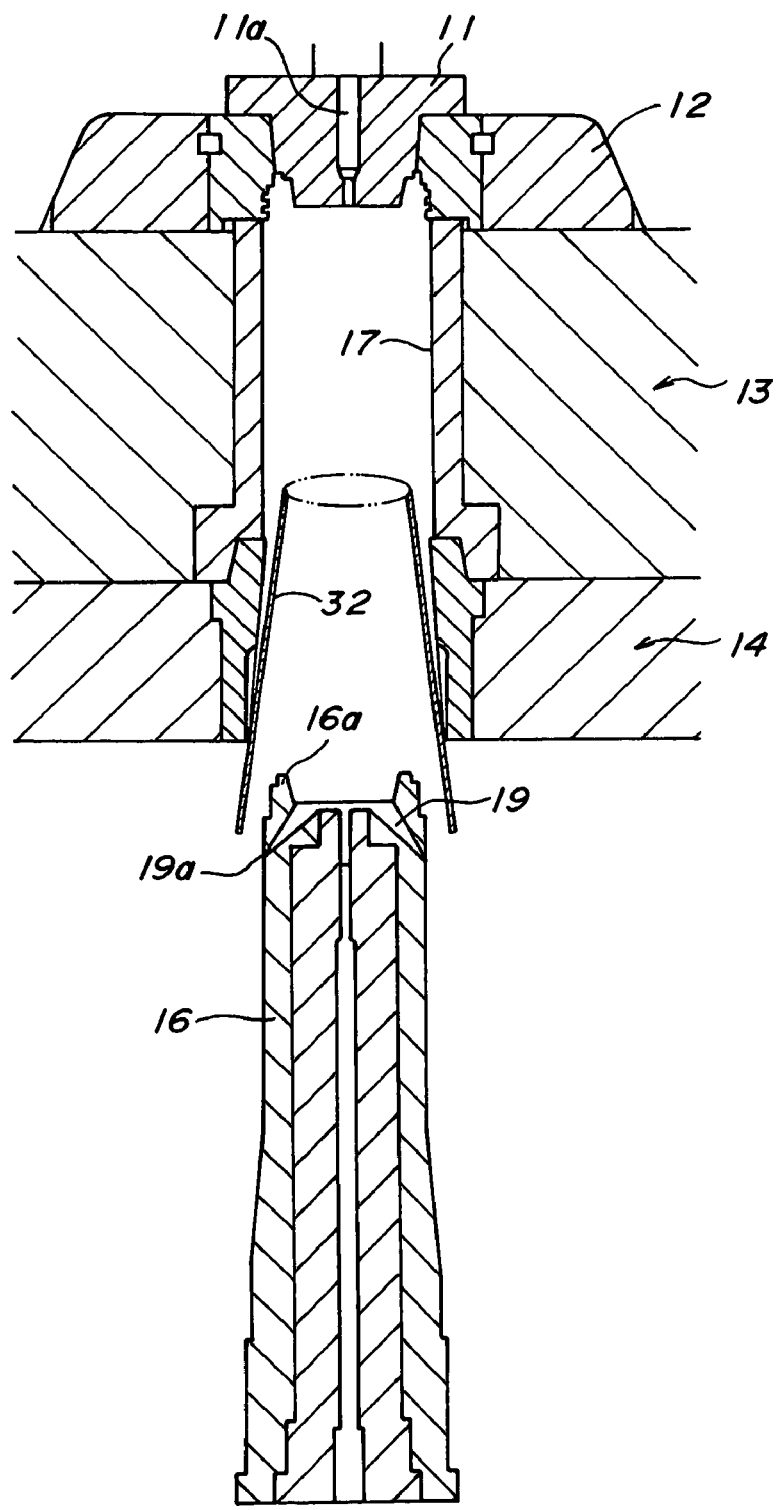
FIG. 4 is a sectional view for illustrating a step for inserting the sheet-shaped insert into a space in the outer mold unit in the state that the molding apparatus in FIG. 2 is opened.

Next, as shown in FIG. 4, a thin insert 32 such as a label, which is rounded in a cylindrical or conical shape, is inserted into an appropriate position in the barrel portion-molding mold unit 13 of the outer mold unit 1 from a lower opening of the stopper mold unit 14 by hands or any other appropriate means, and then released. Consequently, since the outwardly opened gentle taper face is formed at the inner face of the stopper 14, the insert 32 is held at the inner face of the outer mold unit 1 along the taper surface in the state that the insert is extended slightly outwardly in a frusto-conical shape along the above taper surface.

At that time, the insert 32 such as the label is inserted such that a joint end face 12a of both sides of the insert 32 may not be coincident with the gate opening 9a of the gate hole 9 directed toward the upper end of the core 16.

In this way, when the core 16 as the inner mold unit is moved forwardly into the barrel portion-molding mold unit 13 of the outer mold unit from the lower opening of the stopper mold unit 14 in the state that the insert 32 is held at the inner surface of the barrel portion-molding mold unit 13 of the outer mold unit, the core 16 closely contacts the inner surface of the insert 32, and pushes the insert into the barrel portion-molding mold unit 13. When the tip portion 16a of the core 16 is advanced and contacts the end disc 11 of the upper molding mold unit, the insert 32 is extended to closely fit to the inner surface of the outer mold unit. Consequently, a molding cavity 17 having a small gap is formed between the outer mold 1 and the core 16 for the formation of the thin cylindrical body 10, and the molding mold is now closed as shown in FIG. 2.

Figure 6:
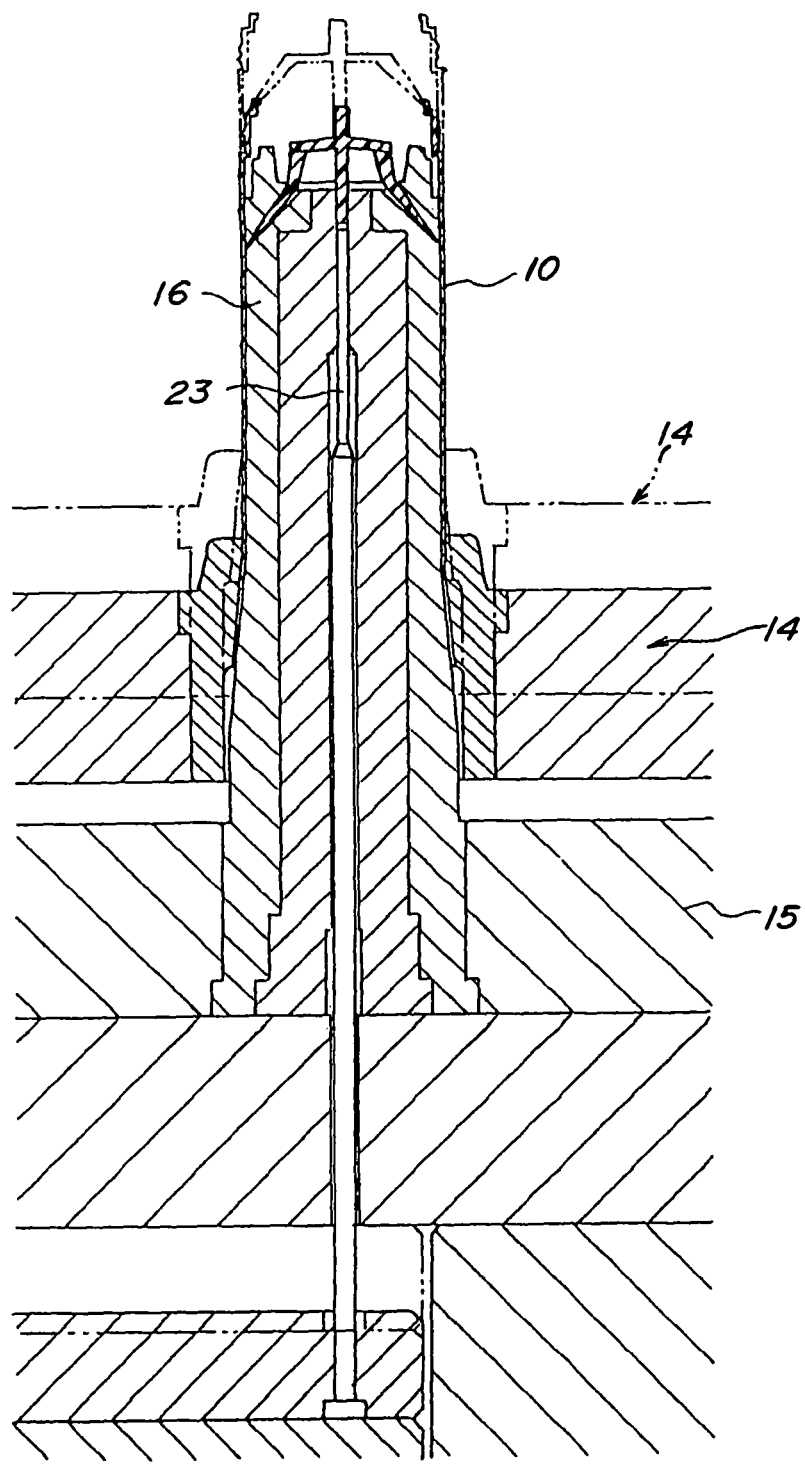
FIG. 6 is a sectional view for illustrating a state in which the sheet-shaped insert-bonded article is released from the mold after the molding apparatus in FIG. 2 is opened.
Figure 8A:
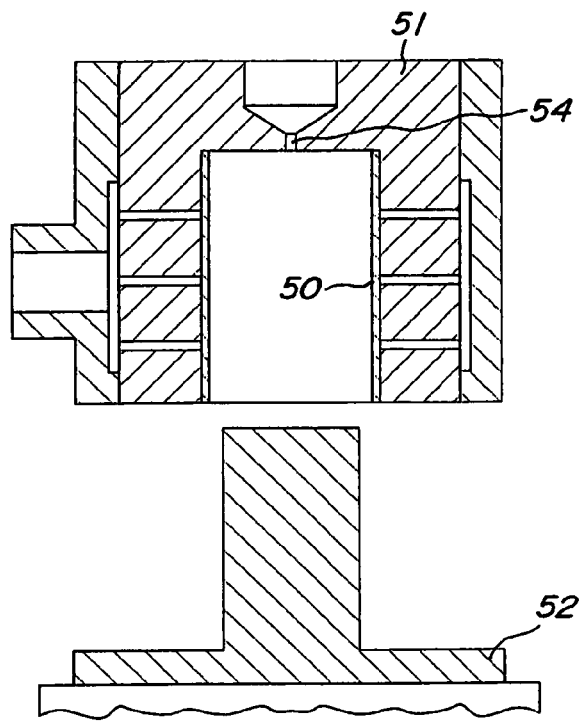
FIGS. 8(a) and 8(b) are sectional views for showing conventional insert injection molding apparatuses.
Figure 8B:
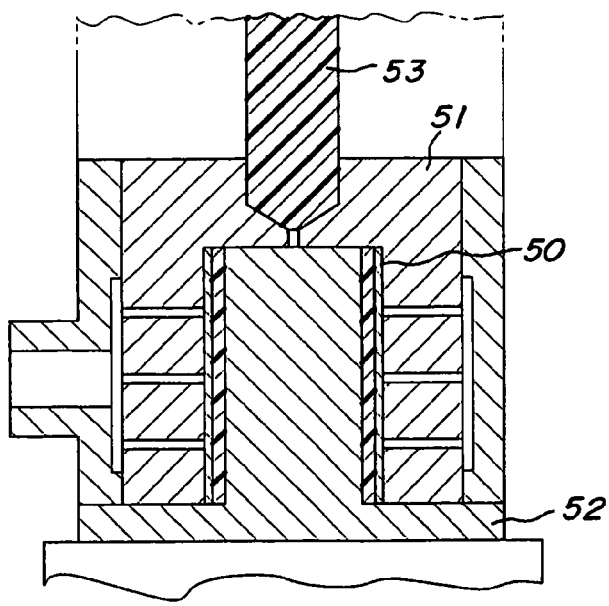
Figure 9:
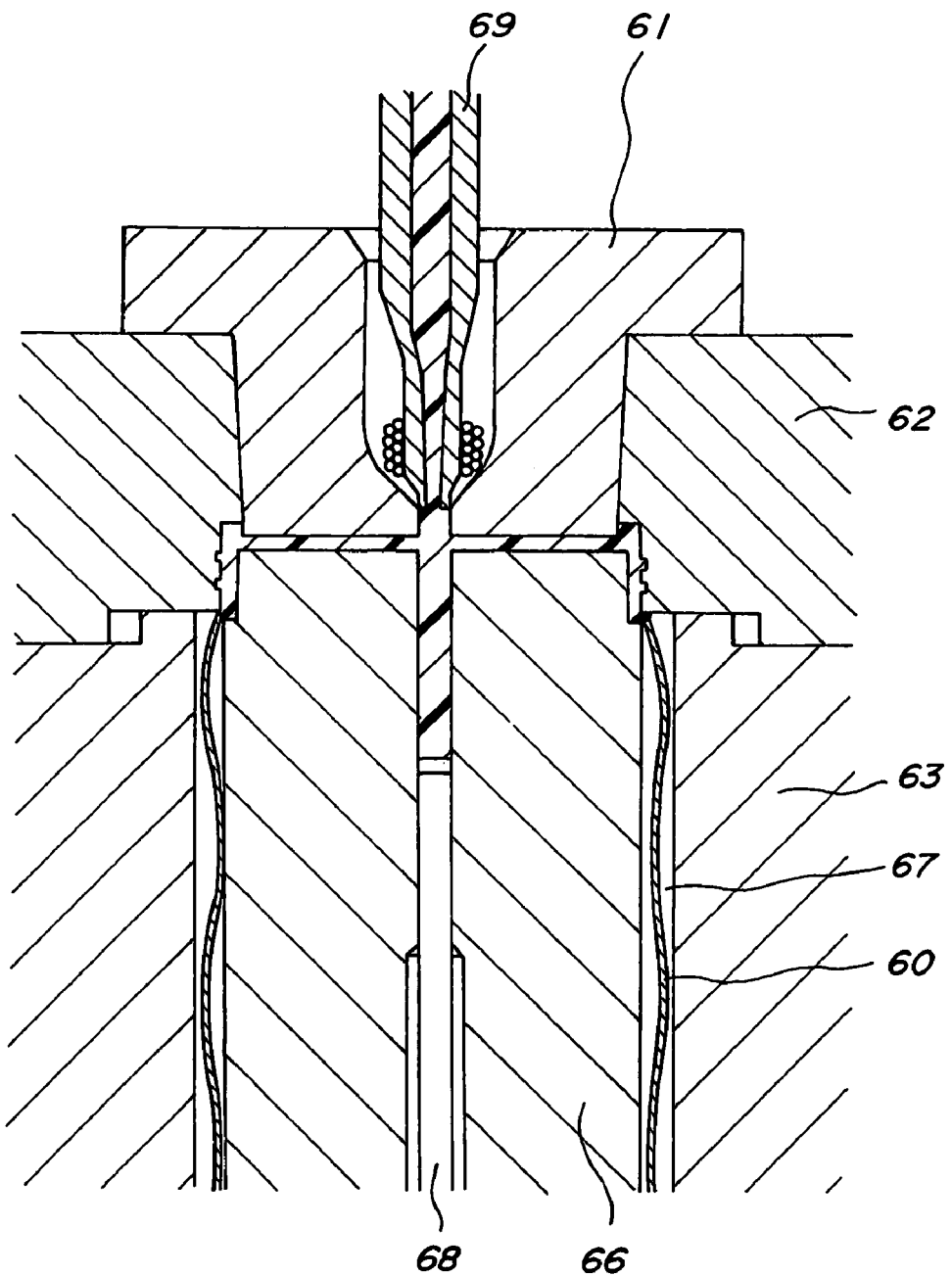
FIG. 9 is a sectional view for illustrating a case where the injection molding is effected by using the conventional insert injection molding apparatus shown in FIGS. 8(a) and 8(b).

As mentioned above, the insert 32 is pushed along the inner surface of the mold unit with a frictional force upon contacting the outer surface of the core 16, and the tip portion 16a of the core 16 contacts a cylindrical head-forming portion of the molding unit 12 for the formation of the mouth portion 10a of the cylindrical body 10. Simultaneously, the lower end portion contacts the end portion of the stopper mold unit 14, so that the core fits into the outer mold unit 1 to close the molding mold. Accordingly, even the thin insert such as label in a frusto-conical shape can be accurately set as shown in FIGS. 2 and 6 without being bent or wrinkled, which enables insertion molding.

The nozzle 6 of the injection molding device is fitted to the injection opening 11a of the end disc 11 of the molding mold in the state that the molding mold is closed in this manner and that the knock-out pin 23 is located at a position shown in FIG. 2, and then the molten resin is injected into the molding cavity 17 through the nozzle 6 by driving an injection screw of the injection molding device not shown. At that time, the molten resin injected flows the gate holes 19 through the runner grooves 18, and is injected into the cavity of the molding mold through the gate openings 19a.

Figure 5:
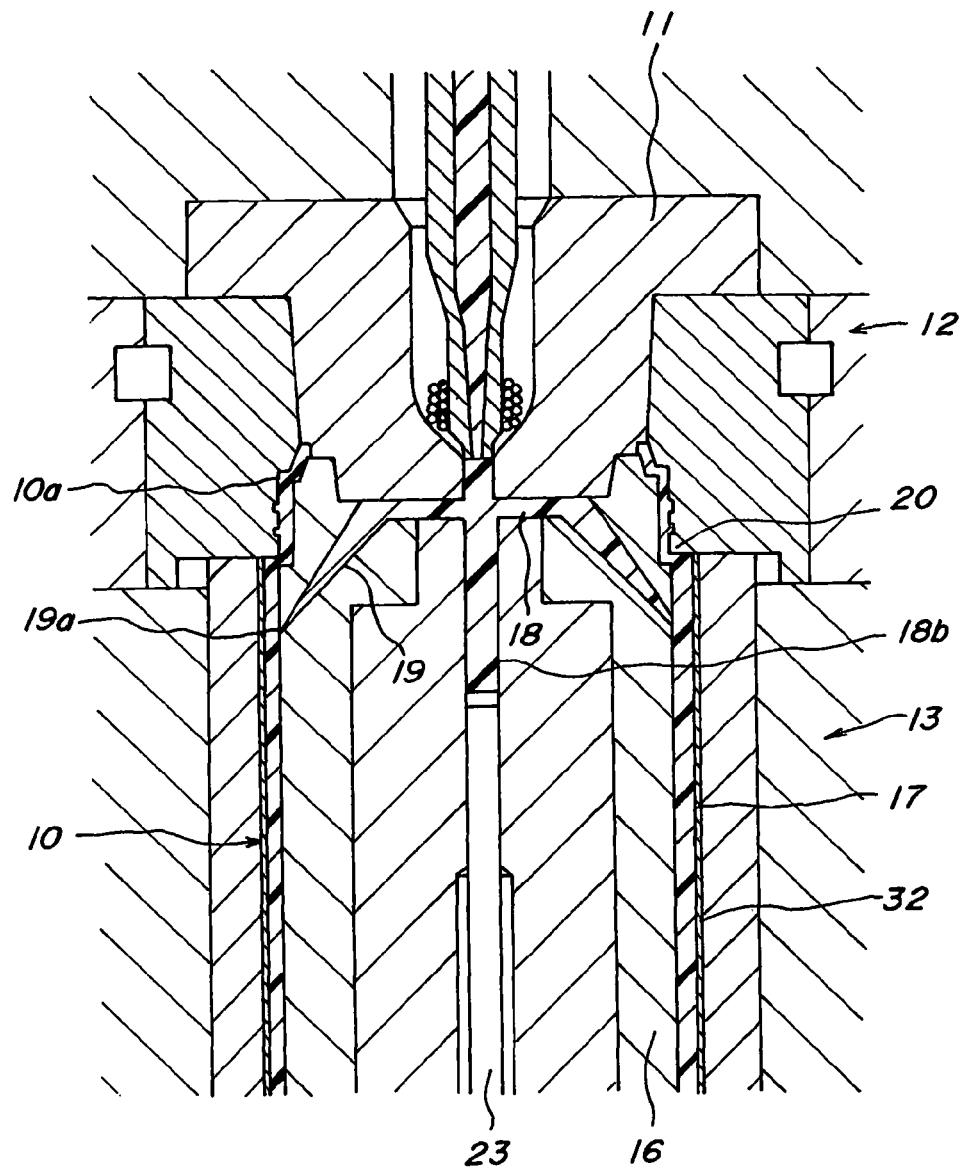
FIG. 5 is a sectional view for illustrating a state in which the sheet-shaped insert-bonded article is injection molded after the molding apparatus in FIG. 2 is closed.

More specifically, as shown in FIG. 5, the molten resin flows into the cavity through the gate openings 19a that is opened at a location axially inwardly spaced from the upper end 12a of the insert 32 under the mouth portion 10a of the cylindrical article 10, and while the molten resin flow pushes the insert 32 set in the cavity to the inner surface of the barrel portion-molding mold unit 13 of the outer mold unit, the flow is distributed to a mouth portion side and a lower end portion to fill the cavity. As a result, the molten resin is molded integrally with the insert. Thus, the molten resin does not flow onto the front side of the insert 32.

After the molten resin is cooled and cured, following the injection molding, the molding mold is opened to remove the article.

First, simultaneously with retracting the injection molding device from the mold, the end disc 11 of the upper molding mold is moved rearwardly to disengage the core 16 from the mouth portion-molding unit 12. Then, the split mold unit of the mouth portion-molding mold 12 is opened to right and left, and then the barrel portion-molding mold unit 13 is upwardly moved, thereby exposing the outer face of the cylindrical article 10. See FIG. 6.

Next, as shown in FIG. 6, the knock-out pin 23 is upwardly moved to knock a runner end 18b, so that a cured resin piece inside the gate openings is separated and pushed away from the gate holes inside the gate openings with the resulting impact force. A the same time, the lower end portion 10c of the cylindrical article 10 is pushed up by upwardly moving the stopper mold unit 14. By so doing, the cylindrical article is released from the outer peripheral surface of the core, and discharged outside the molding mold in the form of an insert-bonded cylindrical molded article as shown in FIG. 7.

As shown in FIG. 7, the cylindrical molded article has the label 32 bonded to the entire surface of the barrel portion, excluding the mouth portion 10a thereof. Completely no resin is attached to the surface of the label, or no wrinkle is recognized thereon. A slight mark 10b of the gate opening only is recognized at the rear side of the cylindrical article 20 at a location deviated from a butted end face 32b of the label.

As explained above, according to the present invention, the insert such as label is integrated with the thin cylindrical article having almost no escape taper surface by the insertion injection molding method, and the injection gate opening of the molding mold is provided in the cylindrical article-molding portion at the position slightly inwardly spaced from the end portion of the insert and inward from the opposite side portions thereof, and the molten resin is injected into the cavity through the gate opening and insertion-molded therein. By so doing, the molten resin is insertion-molded in the state that the insert such as the label is pushed and closely fitted to the inner surface of the outer mold unit with the pressure of the resin. Therefore, the molten resin is prevented from going onto the surface of the label.

It is essential to set the label or the like in the cavity such that the end face or the butted face of the opposite end portions of the insert such as the cylindrical label may not be coincident with the gate opening of the core. If the insert is set in such a state that the end face or the butted face of the opposite side portions of the label or the like is coincident with the gate opening of the core, this is likely to produce an unacceptable article through the injected molten resin entering between the surface of the label and the inner surface of the outer mold unit through the end face of the insert.

Since the outer mold unit and the core for the formation of the barrel portion of the cylindrical body are constituted as the cylindrical split structure in the molding mold according to the present invention, no parting line of the molding mold is formed on the surface of the molded article. Further, the molding cavity for the formation of the thin cylindrical body is defined between the cylindrical outer mold unit and the columnar core inserted therein. Therefore, when the thin insert such as the label is inserted in a cylindrically rounded shape into a middle portion of the outer mold unit and the core is then inserted into the outer mold unit, the insert is contacted and held at the surface of the core, pushed into the cavity, and set at the predetermined position. Therefore, the insert can be easily set, without being needed to be set by using a special means for feeding the label or the like as in the prior art.

When the molding method according to the present invention is used, a film or the like in which printing has been separately effected may be used as the insert such as the label. Therefore, the insert may be preliminarily printed by offset printing, gravure printing or the like. Further, the present invention is also suitable for a case using a metallic surface treatment with gold, silver or the like in combination. As compared with a case where the molded body is directly printed, almost no deviation occurs in the indicating location.

As mentioned above, the present invention has the following effects.

The sheet-shaped insert-bonded cylindrical article comprises a cylindrical molded body, and an insert bonded to an outer peripheral surface of a barrel portion of the cylindrical molded body on molding, wherein a mark of an injection gate opening is positioned at an inner peripheral surface of the cylindrical molded body while being inwardly apart from an upper end of the insert in an axial direction and at a position corresponding to an inner portion of the insert as viewed in width directions from opposite sides of the insert. Therefore the article has excellent appearance. Further, if a laminated film is used as the insert, the insert-bonded cylindrical molded article having excellent light-shielding property and gas barrier property can be obtained.

According to the method for insertion molding the insert-bonded cylindrical article, the insert is fitted, closely attached and held along the inner peripheral surface of the outer molding unit having the cylindrical pull-out mold unit in the molding cavity defined between the outer mold unit and the core inside the injection molding mold, the molten resin is injected, through the injection gate opening provided in the core, toward the inner peripheral surface of the molded body at a position inwardly apart from an upper end of the insert in an axial direction and corresponding to an inner portion as viewed in width directions from opposite sides of the insert, the cylindrical molded body is cured and formed while the insert is being pushed onto the inner peripheral surface of the outer molding unit with the molten resin. Therefore, the molten resin does not flow onto the outer surface of the insert or wrinkled, if the insert is strongly attracted onto the surface of the cavity under vacuum as in the prior art. Therefore, the insertion molding is possible with respect to the thin insert.

The apparatus of the present invention for molding an insert-bonded cylindrical article comprising a cylindrical molded body and an insert integrally bonded to an outer peripheral surface of a barrel body of the cylindrical molded body, said apparatus comprising an outer mold unit having a cylindrical pull-out mold unit and defining a core-inserting space therein, a core to be inserted into the core-inserting space of the outer molding unit from one end thereof and to define a molding cavity between an inner peripheral surface of the core-molding space, and a releasing tool for releasing the shaped insert-bonded cylindrical article from the mold, the outer molding unit comprising a barrel portion-molding mold unit having said core-inserting space and an end portion-molding mold unit to be engaged with the barrel portion-molding mold unit at the other end of the outer mold unit, having a molten resin-injecting opening and being capable of moving outside from an end portion, and the core having a gate hole communicating with the molten resin-injecting opening at one end, having the other end that is at the outer peripheral surface of the core and axially inwardly from the end portions of the insert fitted along the outer peripheral surface of the core-inserting space and at an inner portion of the insert located inwardly from both width sides of the insert. In addition to the above-mentioned effects, the molding apparatus according to the present invention in which the outer mold unit of the molding mold has the fundamental structure of the cylindrical pull-out structure, not the split structure, for insertion molding with the insert such as the label, has the advantages that the article having beautiful appearance with no parting line appears at the surface of thereof can be obtained, while its rigidity is enhanced to reduce the amount of the resin.

The invention claimed is:

1. An insertion-molded cylindrical article, comprising
   a cylindrical molded body including a sidewall portion having an inner surface and an outer surface, defining a mouth end portion and a main body portion, and an injection gate mark positioned on said inner surface, and
   a sheet-shaped insert having an upper edge and a lower edge that define the length of the sheet-shaped insert, and the upper edge is below the mouth end portion of the cylindrical molded body;
   wherein said insert is bonded to said outer surface of said sidewall portion, and
   wherein said injection gate mark is positioned, as a result of the injection, at said inner surface of the cylindrical molded body between said upper and lower edges of said insert so as to be at a position corresponding to a position on said inner surface that is covered by said insert, whereby said insert is bonded solely to said outer surface of said sidewall portion substantially without wrinkles and without injected material on an outer surface of said insert.

2. The insertion-molded cylindrical article set forth in claim 1, further comprising a gap on said outer surface positioned between opposed ends of said insert and not covered by said insert,
   wherein said injection gate mark is not located in said gap.

3. A method for making an insertion-molded cylindrical article using an insertion injection molding mold,
   said insertion-molded article comprising a cylindrical molded body having a bottom portion, a sidewall portion having a molded body inner surface and a molded body outer surface, defining a mouth end portion and a lower portion, and an insert having an upper edge and a lower edge that define the length of the insert, the upper edge is lower than the mouth end portion of the cylindrical molded body;
   said insertion injection molding mold comprising an outer mold unit having an inner surface and a pull-out mold unit and defining a core-inserting space therein, a core having an injection gate opening and shaped to be inserted and fitted into the outer molding unit, and a molding cavity defined between said outer mold unit and said core inside the injection molding mold,
   said method comprising:
   fitting, attaching and holding said insert along said inner surface of the outer molding unit in said molding cavity,
   injecting a molten resin through said injection gate opening, such that the molten resin passes through the injection gate opening in a direction toward said molded body inner surface of the sidewall portion at a position between said upper and lower edges of the insert so as to be at a position corresponding to a position on said molded body inner surface that is covered by said insert so that an injection gate mark is covered by the insert, and
   curing and forming the cylindrical molded body while pushing the insert against the inner surface of the outer molding unit with the molten resin, the upper and lower end portions of the cylindrical molded body each defining an opening;
   wherein said insert is solely bonded to said molded body outer surface of said sidewall portion of the cylindrical molded body substantially without wrinkles and without injected material on an outer surface of said insert.

4. The method set forth in claim 3, wherein said insertion-molded article further comprises a gap on said molded body outer surface of said sidewall portion positioned between opposed ends of said insert and not covered by said insert;
   wherein the insert is fitted, attached and held along said inner surface of the molding cavity, and
   wherein the molten resin is not injected toward said gap.

5. The method set forth in claim 3, wherein a knock-out pin is provided in the core, said method further comprising:
   upwardly pulling out the pull-out mold unit of the outer mold unit after the insertion molding,
   cutting a connection between the cured resin inside the injection gate hole and the cylindrical molded body by raising the knock-out pin, and
   removing the cylindrical article from the core by pushing the bottom portion of the cylindrical molded body.

6. The method set forth in claim 3, wherein the insert is fitted, attached and held in a cylindrical shape along the inner surface of the outer mold unit in the molding cavity by applying a contact frictional force between the core and the insert, said contact frictional force formed by placing the insert into the outer mold unit while the core of the injection molding mold is pulled out from the outer mold unit and the molding cavity is opened, and forwardly moving the core into the outer mold unit.

7. The method set forth in claim 4, wherein a knock-out pin is provided in the core, said method further comprising:
   upwardly pulling out the pull-out mold unit of the outer core mold unit after the injection molding,
   cutting a connection between the cured resin inside the injection gate hole and the cylindrical molded body by raising the knock-out pin, and
   removing the cylindrical article from the core by pushing the bottom portion of the gate cylindrical molded body.

8. The method set forth in claim 4, wherein the insert is fitted, attached and held in a cylindrical shape along the inner surface of the outer mold unit in the molding cavity by applying a contact frictional force between the core and the insert, said contact frictional force formed by placing the insert in the cylindrical shape into the outer mold unit while the core of the injection molding mold is pulled out from the outer mold unit and the molding cavity is opened, and forwardly moving the core into the outer mold unit.

9. The method set forth in claim 5, wherein the insert is fitted, attached and held in a cylindrical shape along the inner surface of the outer mold unit in the molding cavity by applying a contact frictional force between the core and the insert, said contact frictional force formed by placing the insert in the cylindrical shape into the outer mold unit while the core of the injection molding mold is pulled out from the outer mold unit and the molding cavity is opened, and forwardly moving the core into the outer mold unit.

10. The insertion-molded cylindrical article of claim 1, wherein said injection gate mark is positioned only at said inner surface of the sidewall portion while being closer to said upper edge than said lower edge of said insert in an axial direction of the cylindrical article and only at a position corresponding to a position on said inner surface that is covered by said insert.

11. The method set forth in claim 3, comprising injecting said molten resin through said injection gate opening, such that the molten resin passes through the injection gate opening in a direction toward said molded body inner surface only at a position closer to said upper edge than said lower edge of the insert in an axial direction of the cylindrical molded body and only at a position corresponding to a position on said cylindrical molded body inner surface that is covered by said insert.

12. The insertion-molded cylindrical article set forth in claim 1, wherein said insert is bonded to an entire surface of said outer surface of said sidewall portion, excluding a mouth portion of the cylindrical molded body.

13. The method set forth in claim 3, wherein said insert is bonded to an entire surface of said outer surface of said sidewall portion, excluding a mouth portion of the cylindrical molded body.

14. An insertion-molded cylindrical article made by an insertion injection molding mold,
said insertion-molded article comprising a cylindrical molded body having a bottom portion, a sidewall portion having a molded body inner surface and a molded body outer surface, defining a mouth end portion and a main body portion, upper and lower end portions, and an insert having an upper edge and a lower edge that define the length of the insert, the upper edge is lower than the mouth end portion of the cylindrical molded body;
said insertion injection molding mold comprising an outer mold unit having an inner surface and a pull-out mold unit and defining a core-inserting space therein, a core having an injection gate opening and shaped to be inserted and fitted into the outer molding unit, and a molding cavity defined between said outer mold unit and said core inside the injection molding mold,
the article being made by a method comprising:
fitting, attaching and holding said insert along said inner surface of the outer molding unit in said molding cavity,
injecting a molten resin through said injection gate opening, such that the molten resin passes through the injection gate opening in a direction toward said molded body inner surface of the sidewall portion at a position between said upper and lower edges of the insert so as to be at a position corresponding to a position on said molded body inner surface that is covered by said insert so that an injection gate mark is covered by the insert, and
curing and forming the cylindrical molded body while pushing the insert against the inner surface of the outer molding unit with the molten resin, the upper and lower end portions of the cylindrical molded body each defining an opening,
wherein said insert is solely bonded to said molded body outer surface of said sidewall portion of the cylindrical molded body substantially without wrinkles and without injected material on an outer surface of said insert.

15. The method set forth in claim 5, wherein the injection gate mark is formed by said step of cutting a connection between the cured resin inside the injection gate hole and the cylindrical molded body.

16. An insertion-molded cylindrical article comprising:
a cylindrical molded body including a sidewall portion having an inner surface and an outer surface, defining a mouth end portion and a main body portion, and an injection gate mark positioned on said inner surface, and
a sheet-shaped insert having an upper edge and a lower edge that define the length of the sheet-shaped insert, and the upper edge is below the mouth end portion of the cylindrical molded body;
wherein said insert is bonded to said outer surface of said sidewall portion,
wherein said injection gate mark is positioned, as a result of the injection, at said inner surface of the cylindrical molded body between said upper and lower edges of said insert so as to be at a position corresponding to a position on said inner surface that is covered by said insert,
wherein the article is formed in an insertion injection mold which includes an outer mold unit having an inner surface and a pull-out mold unit and defining a core-inserting space therein, a core having an injection gate opening and a knock-out pin and shaped to be inserted and fitted into the outer molding unit, and a molding cavity defined between said outer mold unit and said core inside the injection molding mold,
where the article is made from a method comprising;
fitting, attaching and holding said insert along said inner surface of the outer molding unit in said molding cavity,
injecting a molten resin through said injection gate opening, such that the molten resin passes through the injection gate opening in a direction toward said molded body inner surface of the sidewall portion at a position between said upper and lower edges of the insert so as to be at a position corresponding to a position on said molded body inner surface that is covered by said insert so that the injection gate mark is covered by the insert, and
curing and forming the cylindrical molded body while pushing the insert against the inner surface of the outer molding unit with the molten resin,
upwardly pulling out the pull-out mold unit of the outer mold unit after the insertion molding,
cutting a connection between the cured resin inside the injection gate hole and the cylindrical molded body by raising the knock-out pin, thereby forming the injection gate mark on the inner surface of sidewall portion of the cylindrical molded body, and
removing the cylindrical article from the core by pushing the bottom portion of the cylindrical molded body.

17. The method set forth in claim 3, wherein said injection gate opening is tapered-like thinned and proceeds downward at an angle.

18. The insertion-molded cylindrical article made by the insertion injection molding mold set forth in claim 14, wherein said injection gate opening is tapered-like thinned and proceeds downward at an angle.

19. The insertion-molded cylindrical article set forth in claim 16, wherein said injection gate opening is tapered-like thinned and proceeds downward at an angle.

* * * * *